(12) United States Patent
Finkelstein et al.

(10) Patent No.: US 7,075,940 B1
(45) Date of Patent: Jul. 11, 2006

(54) METHOD AND APPARATUS FOR GENERATING AND USING DYNAMIC MAPPINGS BETWEEN SETS OF ENTITIES SUCH AS BETWEEN OUTPUT QUEUES AND PORTS IN A COMMUNICATIONS SYSTEM

(75) Inventors: Ehud Finkelstein, Tel Aviv (IL); Sarig Livne, Tel Aviv (IL); Doron Shoham, Shoham (IL); Amir Michaeli, Hertzelya (IL)

(73) Assignee: Cisco Technology, Inc., San Jose, CA (US)

( * ) Notice: Subject to any disclaimer, the term of this patent is extended or adjusted under 35 U.S.C. 154(b) by 937 days.

(21) Appl. No.: 10/139,787

(22) Filed: May 6, 2002

(51) Int. Cl.
*H04L 12/54* (2006.01)

(52) U.S. Cl. .................................... 370/412

(58) Field of Classification Search ............... 370/412, 370/413, 414, 415, 416, 417, 418, 419, 428, 370/389, 252, 254, 229, 231
See application file for complete search history.

(56) References Cited

U.S. PATENT DOCUMENTS

| | | | |
|---|---|---|---|
| 4,491,945 A | 1/1985 | Turner | |
| 4,494,230 A | 1/1985 | Turner | |
| 4,630,260 A | 12/1986 | Toy et al. | |
| 4,734,907 A | 3/1988 | Turner | |
| 4,829,227 A | 5/1989 | Turner | |
| 4,849,968 A | 7/1989 | Turner | |
| 4,893,304 A | 1/1990 | Giacopelli et al. | |
| 4,901,309 A | 2/1990 | Turner | |
| 5,127,000 A | 6/1992 | Henrion | |
| 5,173,897 A | 12/1992 | Schrodi et al. | |
| 5,179,551 A | 1/1993 | Turner | |
| 5,179,556 A | 1/1993 | Turner | |
| 5,229,991 A | 7/1993 | Turner | |
| 5,253,251 A | 10/1993 | Aramaki | |
| 5,260,935 A | 11/1993 | Turner | |
| 5,339,311 A | 8/1994 | Turner | |
| 5,402,415 A | 3/1995 | Turner | |
| 5,519,701 A | 5/1996 | Colmant et al. | |

(Continued)

OTHER PUBLICATIONS

Jonathan S. Turner, "An Optimal Nonblocking Multicast Virtual Circuit Switch," Jun. 1994, Proceedings of Infocom, 8 pages.

(Continued)

*Primary Examiner*—Dang T. Ton
(74) *Attorney, Agent, or Firm*—The Law Office of Kirk D. Williams

(57) ABSTRACT

Methods and apparatus are disclosed for dynamically mapping between sets of entities. In one implementation, queues corresponding to a particular output are mapped into a sequential set of renamed queue identifiers. In transmitting an item, a particular renamed queue identifier is selected, and then the particular item is communicated from the actual queue to the particular output. In one implementation, groups corresponding to a particular output are mapped into a sequential set of renamed group identifiers, and queues corresponding to a particular renamed group are mapped into a sequential set of renamed queue identifiers. In transmitting an item, a particular renamed group identifier is selected, and then a particular renamed queue identifier from within is selected. In one implementation, a second set of mappings is generated while the system uses a first set of mappings, and then the system switches in real-time to the second set of mappings.

29 Claims, 12 Drawing Sheets

| U.S. PATENT DOCUMENTS | | | |
|---|---|---|---|
| 5,561,663 A | | 10/1996 | Klausmeier |
| 5,629,928 A | | 5/1997 | Calvignac et al. |
| 5,699,537 A | * | 12/1997 | Sharangpani et al. ....... 712/217 |
| 5,765,032 A | | 6/1998 | Valizadeh |
| 5,838,915 A | | 11/1998 | Klausmeier et al. |
| 5,838,994 A | | 11/1998 | Valizadeh |
| 5,842,040 A | | 11/1998 | Hughes et al. |
| 5,905,725 A | | 5/1999 | Sindhu et al. |

OTHER PUBLICATIONS

Chaney et al., "Design of a Gigabit ATM Switch," Feb. 5, 1996, WUCS-96-07, Washington University, St. Louis, MO, 20 pages.

Turner et al., "System Architecture Document for Gigabit Switching Technology," Aug. 27, 1998, Ver. 3.5, ARL-94-11, Washington University, St. Louis, MO, 110 pages.

* cited by examiner

METHOD AND APPARATUS FOR
GENERATING AND USING DYNAMIC
MAPPINGS BETWEEN SETS OF ENTITIES
SUCH AS BETWEEN OUTPUT QUEUES AND
PORTS IN A COMMUNICATIONS SYSTEM

FIELD OF THE INVENTION

This invention especially relates to communications and computer systems; and more particularly, the invention relates to mapping sets of entities to other sets of entities, such as, but not limited to dynamically mapping of outputs queues to outputs internal to or external to a router, packet switching system, or other communications or computer system.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet. For example, an enqueuing component of such a device receives a stream of various sized packets which are accumulated in an input buffer. Each packet is analyzed, and an appropriate amount of memory space is allocated to store the packet. The packet is stored in memory, while certain attributes (e.g., destination information and other information typically derived from a packet header or other source) are maintained in separate memory. Once the entire packet is written into memory, the packet becomes eligible for processing, and an indicator of the packet is typically placed in an appropriate destination queue for being serviced according to some scheduling methodology.

In some communications devices, one or more output queues are mapped into one or more output ports. These output queues may contain traffic data with specific quality of service characteristics, while the output ports typically represent specific physical output interfaces and/or unique traffic groups which may be processed further within the communication device before being mapped to the actual physical output port. This processing typically requires an efficient hardware implementation for mapping a set of N output queues (typically labeled 0 to N–1) to a set of M output ports (typically labeled 0 to M–1). In one system, any output queue may be mapped to a single output port, and any output port can be mapped to zero or more (up to N–1) output queues. The mapping mechanism should allow a decision for selecting an output queue from the set of N possible output queues based on what queues are mapped to the current output port, the state of an output queue, and the type of traffic maintained an output queue.

One known approach uses a bit mask representing output queue to port mapping. This approach requires an M×N bit array representing an N bit mask for every output queue (0 . . . N–1). When scheduling output queue n (0 . . . N–1), the appropriate mask is used to mask only the appropriate output queues. One drawback of this method is the large memory requirement. For example, for a 2048*8192 mapping, a 16 Mbit internal chip memory is required.

One known approach uses a low/high range table. This method restricts the mapping by requiring each output queue to be mapped only to a sequential set of output queues. When scheduling output queue n (0 . . . N–1), the low/high entries for this output queue are used to drive a mask generator masking the irrelevant output queues. The table required by this method uses $2*\log_2(N)*M$ bits. One drawback of this method is the inflexibility caused by the requirement of contiguous output ports. This prevents adding an output queue to an output port without remapping all other output queues.

One known approach uses a linked list. This approach links all queues that are mapped to a specific output port on a linked list, and maintains this linked list. One advantage of this method is that linked lists can be easily updated dynamically. One drawback is that if the current queue at the top of the linked list is not ready for scheduling, the next list item needs to be read. This means that the scheduling time is bounded by N linked list lookups which may take a significant amount of time. A variation on this scheme maintains more than one list for each port, wherein there is a separate list for queues that are ready for scheduling. Some problems of this approach may include design complexity caused by coherency issues (e.g., simultaneous dequeue/enqueue), a large number of special cases when the list is almost empty, and multiple sequential memory accesses required for each operation.

SUMMARY OF THE INVENTION

Methods and apparatus are disclosed for dynamically mapping sets of entities (e.g., queues, ports, any physical or logical items or data structures) to other sets of entities, such as, but not limited to entities and mappings within one or more routers, packet switching systems, or other communications or computer components, devices, or systems. One embodiment dynamically generates and uses mappings of queues to outputs. In one embodiment, queues corresponding to a particular output are mapped into a sequential set of renamed queue identifiers. In transmitting an item, such as, but not limited to a packet, to or from a particular output, a particular renamed queue identifier is identified, the actual queue is identified based on the particular renamed queue identifier, and the particular item is communicated from the actual queue to the particular output. In one embodiment, groups corresponding to a particular output are mapped into a sequential set of renamed group identifiers, and queues corresponding to a particular renamed group are mapped into a sequential set of renamed queue identifiers. In transmitting an item to or from a particular output, a particular renamed group identifier is identified, a particular renamed queue identifier within the identified renamed group is selected, the actual queue is identified based on the particular renamed queue identifier, and the particular item is communicated from the actual queue to the particular output. In one embodiment, a second set of mappings is generated while a system uses a first set of mappings, and then the system switches in real-time to the second set of mappings.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
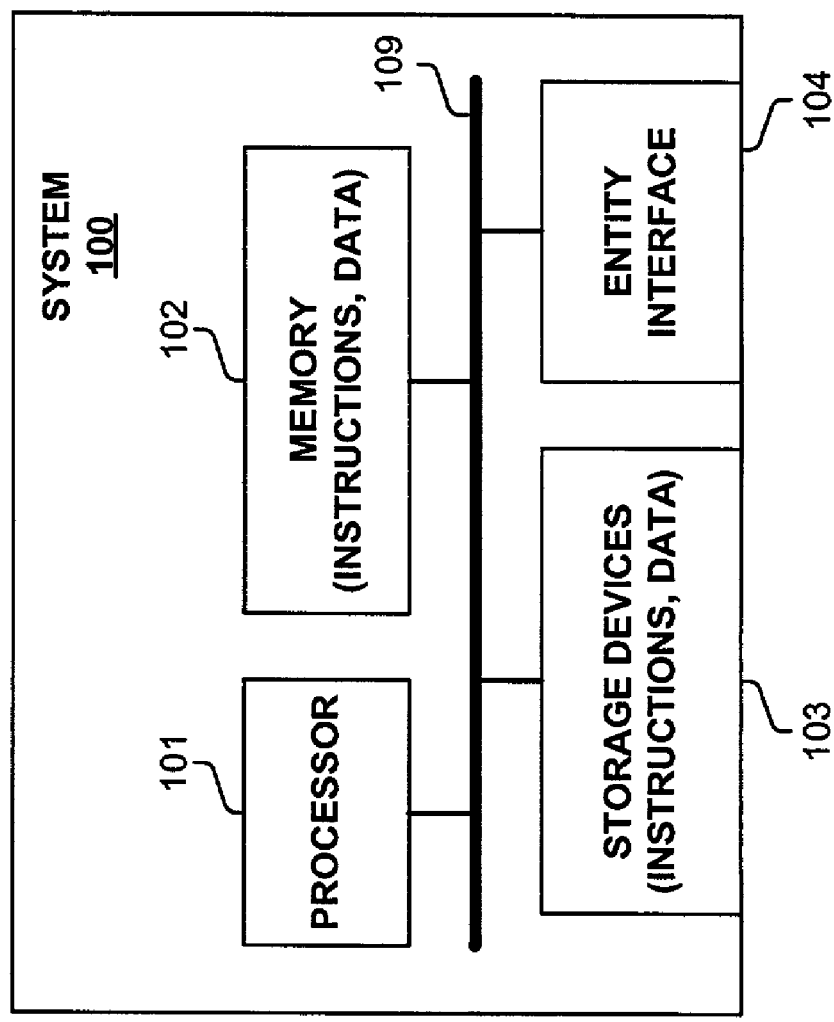
FIG. 1 is a block diagram of one embodiment that generates and uses dynamic mappings of sets of entities to other sets of entities.

Methods and apparatus are disclosed for dynamically mapping sets of entities (e.g., queues, ports, any physical or logical items or data structures) to other sets of entities, such as, but not limited to entities and mappings within one or more routers, packet switching systems, or other communications or computer components, devices, or systems. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements.The term "storage device" includes any solid state storage media, disk drives, diskettes, networked services, tape drives, and other storage devices. Memories and storage devices may store computer-executable instructions to be executed a processor and/or control logic, and data which is manipulated a processor and/or control logic. The term "data structure" is an extensible term referring to any data element, variable, data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modify or not modifying the coupled signal or communicated information. The term "subset" is used to indicate a group of all, less than all, or none of the elements of a set. Moreover, the term "or" is used herein to identify an alternative selection of one or more, including all, of the conjunctive items.

Methods and apparatus are disclosed for dynamically mapping sets of entities (e.g., queues, ports, any physical or logical items or data structures) to other sets of entities, such as, but not limited to entities and mappings within one or more routers, packet switching systems, or other communications or computer components, devices, or systems. Many embodiments described herein specifically refer to mapping queues to outputs. However, the number and type of embodiments and applications thereof are extensible, and the discussion of how to dynamically map and cut-over these mappings are applicable to any other types of entities, and not limited to queues and outputs. Moreover, many embodiments are described herein as mapping a first set of entities to a second set of entities, and/or mapping from a first set of entities to a second set of entities to a third set of entities, and so on. One or more embodiments perform K-levels of mappings, wherein the value of K may vary between embodiments, with the value of K typically selected to match a particular need, application, implementation and/or other characteristic of the corresponding embodiment or of the system including the corresponding embodiment.

In one embodiment, output queues are dynamically mapped to output ports. In one embodiment, queues corresponding to a particular output are mapped into a sequential set of renamed queue identifiers. In transmitting an item (e.g., a packet) from a particular output, a particular renamed queue identifier is selected, the actual queue is identified based on the particular renamed queue identifier, and the particular item is communicated from the actual queue to the particular output. In one embodiment, groups corresponding to a particular output are mapped into a sequential set of renamed group identifiers, and queues corresponding to a particular renamed group are mapped into a sequential set of renamed queue identifiers. In transmitting an item from a particular output, a particular renamed group identifier is identified, a particular renamed queue identifier within the identified renamed group is selected, the actual queue is identified based on the particular renamed queue identifier, and the particular item is communicated from the actual queue to the particular output. In one embodiment, a second set of mappings is generated while the system uses a first set of mappings, and then the system switches in real-time to the second set of mappings.

In one embodiment, a pre-processing stage is used to translate the output queue identifiers to renamed output queue identifiers or numbers. In one embodiment, contiguous renamed queue numbers are used to identify queues assigned to an output port. Thus, for a particular output port, its corresponding queues can be identified from an upper and a lower renamed queue values. In one embodiment, the translation of the output queue identifiers to renamed queue identifiers is identified in a data structure, such as in a renaming table. In one embodiment having N output queues and M output ports, a renaming table of a $N*\log_2(N)$ array is used in addition to the $2*\log_2(N)*M$ table already required for the low/high range table.

In one embodiment, queues are dynamically allocated and/or reassigned to a new or different output port by creating a second renaming table identifying the new mappings. Then, a cut-over operation is performed to replace the renaming table with the second renaming table. This cut-over operation can be performed at system initialization time or during runtime operations of the system such that it does not need to be reinitialized. For example, while one set of tables is used for active mapping, the other table set is prepared in the background with a new mapping set. When the second set is ready, a control bit is swapped, selecting the other set for use, allowing the use of the original table set for yet-another table mapping in the background. Thus, output queue numbers can be dynamically changed, and new output queue to output port mappings can be added, without renumbering or changing existing output queues.

In one embodiment, N output queues are mapped to N renamed queues, using a $N*\log_2(N)$ table. A contiguous range of renamed queues are mapped to each output port. This mapping is maintained by keeping the low/high renamed-queue index for each of the M output ports, using a $2*\log_2(N)*M$ table. By replacing an arbitrary set of non-contiguous output queues with a contiguous set of renamed-queues that can be represented by a low/high index, a general mapping table can be represented using a substantially smaller amount of memory. Some embodiments use different methods for selecting a queue based on a sub-range of queues represented by a 0 to (N−1) bit field.

In a packet switching system including one embodiment, during a packet enqueue, an output queue number is translated to a renamed-queue number, and all internal information is stored based on the renamed-queue number. During a packet dequeue operation, the output port number is used to identify the low/high renamed-queue index. An N-bit renamed-queue mask is built where the mask is 1 for the renamed-queues in range, based on the low/high index. The mask is used to disable the renamed-queue state bits which are outside the low/high index range. An output queue is scheduled based on the state bits of each queue and the renamed-queues mask.

FIG. 1 illustrates one embodiment of an apparatus with a system 100 determining and/or using dynamic mappings of a first set of entities to a second set of entities, such as, but not limited to mapping queues to outputs. In one embodiment, system 100 includes a processor 101, memory 102, storage devices 103, and an entity interface 104, coupled together by a communications mechanism 109 (shown as a bus for illustrative purposes). Various embodiments of system 100 may include more or less elements. For example, one embodiment does not include storage devices 103. Memory 102 and/or storage devices 103 typically store computer-executable instructions to be executed by processor 101 and/or data which is manipulated by processor 101 for implementing functionality in accordance with embodiments of the invention.

The operation of system 100 is typically controlled by processor 101 using memory 102 and storage devices 103 to perform one or more tasks or processes, such as determining and dynamically mapping the first set of entities to the second set of entities. In one embodiment, memory 102 stores one or more sets of such mappings. In one embodiment, while an active mapping is used, system 100 determines a second mapping of the one set of entities to another set of entities and stores this mapping in one or more data structures in memory 102. The active mapping is then replaced with the second mapping in system 100 or in another system receiving this mapping via entity interface 104. In one embodiment wherein the entities correspond to queues and outputs, items are received by system 100 over entity interface 104 and placed in appropriate queues within memory 102, and then distributed according to an active mapping to output queues within memory 102 or to outputs ports in output queue and output port interface 104.

Figure 2:
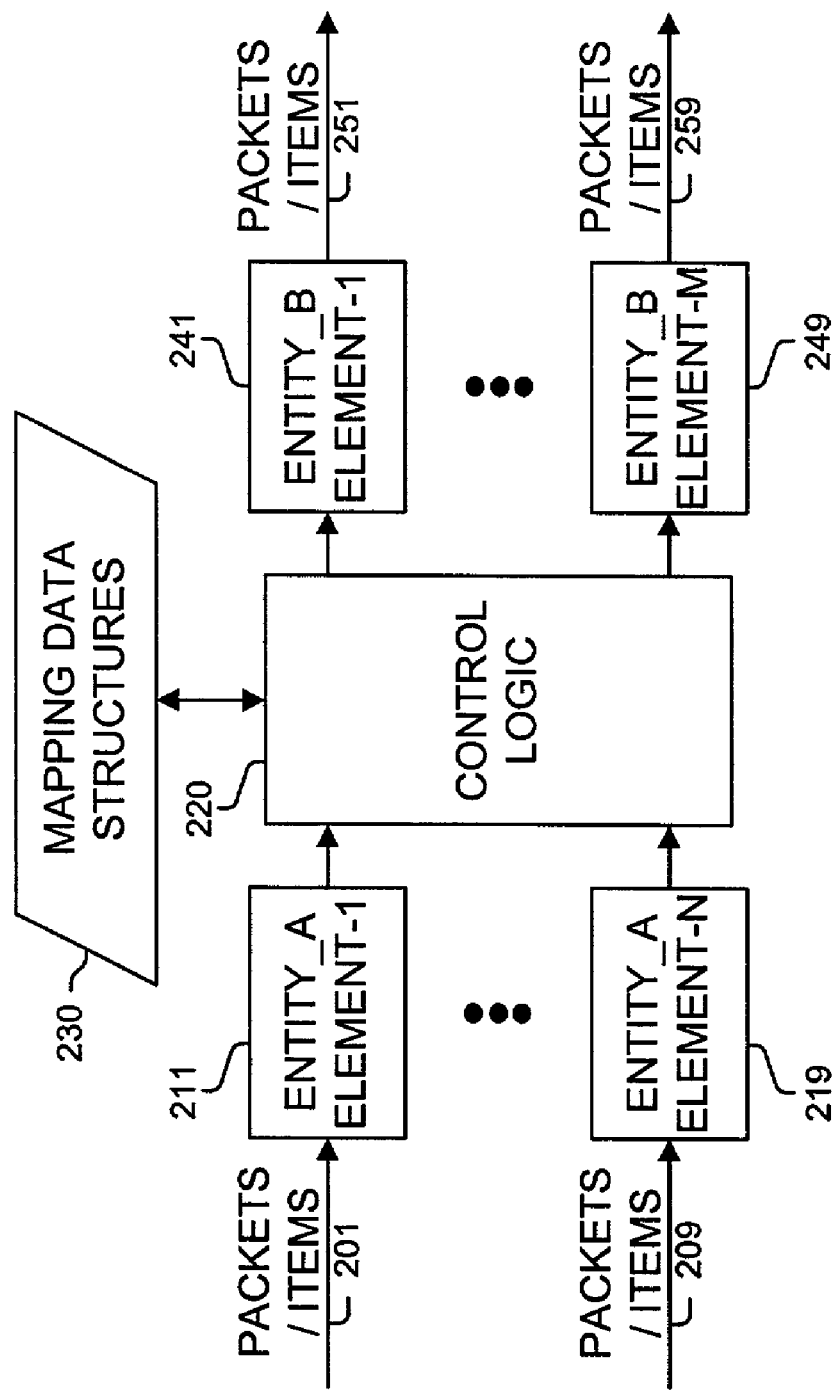
FIG. 2 is a block diagram of one embodiment that generates and uses dynamic mappings of sets of entities to other sets of entities.

FIG. 2 illustrates one embodiment generating and/or using dynamic mappings of a first set of entities to a second set of entities. In one embodiment items (e.g., packets or other information) 201–209 are received one or more of the N entity_A elements 211–219. Control logic 220, with reference to mapping data structures 230, communicates or sends items from the N entity_A elements 211–219 to the M entity_B elements 241–249, with entity_B elements 241–249 generating corresponding items 251–259. In one embodiment, mapping data structures 230 includes multiple mappings which can be dynamically generated and updated by control logic 220. Additionally in one embodiment, control logic 220 can switch among the mappings stored in data structures 230 during system operation.

Figure 3:
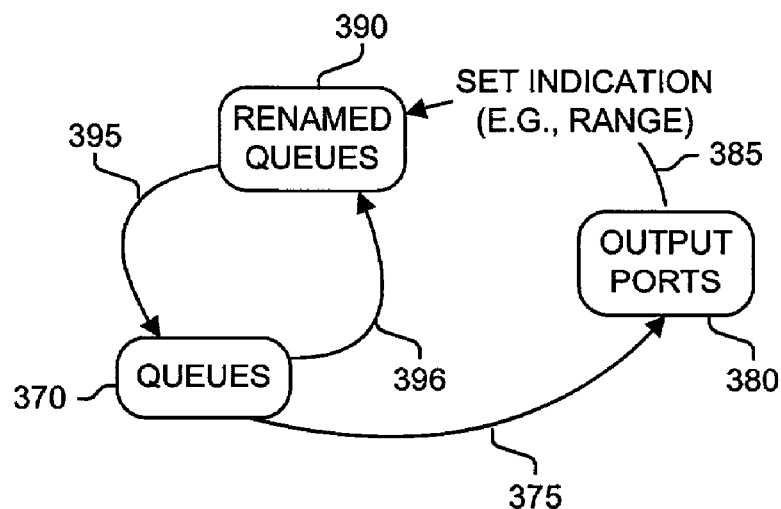
FIG. 3 is a block diagram of a set of mappings used in one embodiment.

FIG. 3 illustrates a set of mappings 375, 385, 395 and 396 used in one embodiment. In one embodiment, a set of queues 370 are mapped into a sequential set of renamed queues 390. When one of the outputs 380 is ready for another item from one of the actual queues 370, a particular renamed queue is identified within the range of corresponding renamed queues 390 for the particular one of outputs 380, the actual one of queues 370 is identified based on the particular renamed queue, and the item is communicated from the actual one of the queues 370 to the particular one of outputs 380.

Figure 4A:
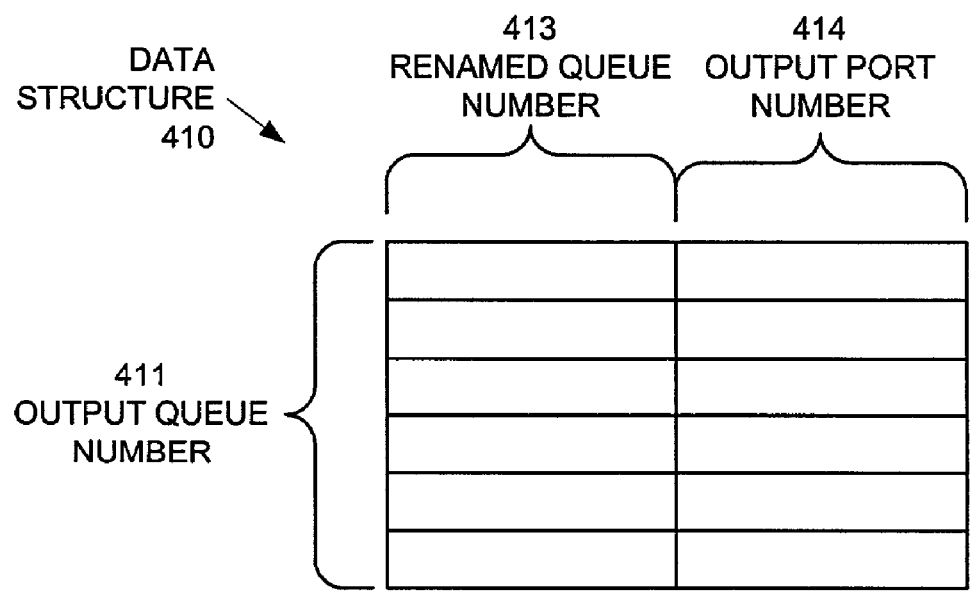
FIGS. 4A–C are block diagrams of data structures used in one embodiment to represent a set of mappings.
Figure 4B:
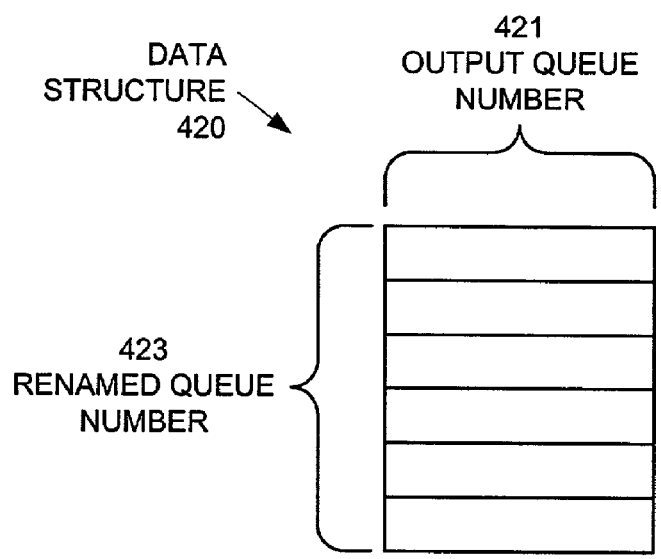
Figure 4C:
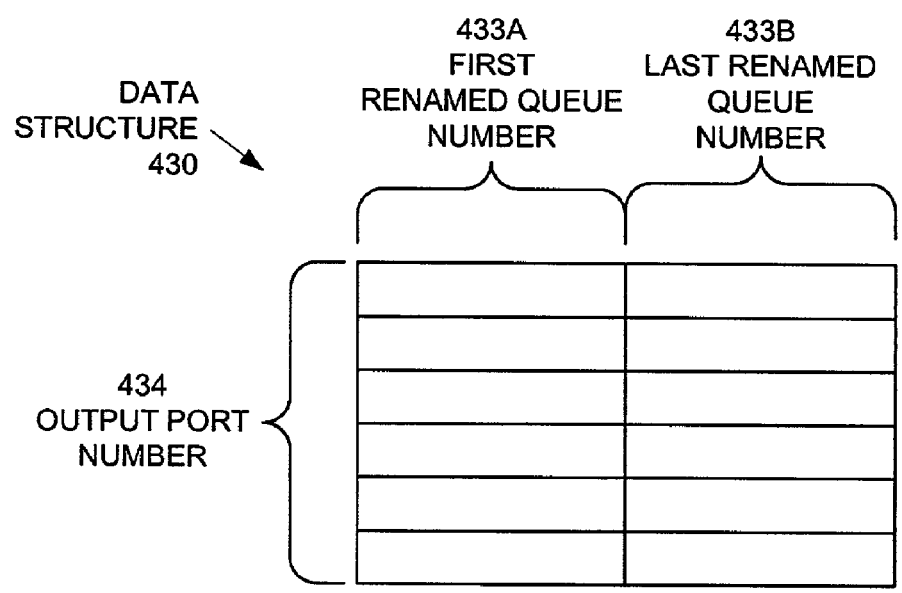

FIGS. 4A–C are block diagrams of data structures used in one embodiment to represent a set of mappings (such as, but not limited to mappings 375, 385, 395 and 396 from FIG. 3). FIG. 4A illustrates one data structure 410 used in one embodiment for identifying a renamed queue number 413 and an output port number 414 based on an output queue number 411. FIG. 4B illustrates one data structure 420 used in one embodiment for identifying an output number 421 based on a renamed queue number 423. FIG. 4C illustrates one data structure 430 used in one embodiment for identifying a range of renamed queue numbers (i.e., first and last renamed queue numbers 433A and 433B) based on an output port number 434.

Figure 5A:
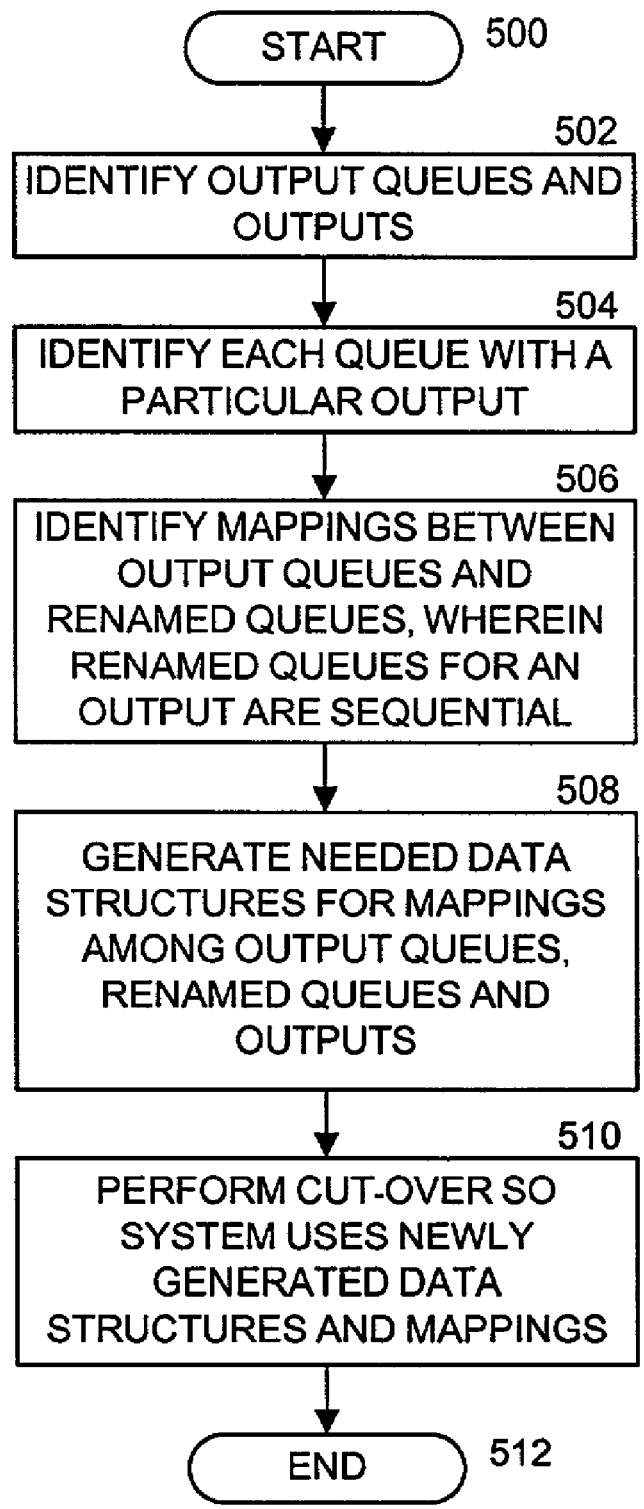
FIGS. 5A–B are flow diagrams used in one embodiment for generating and using a set of dynamic mappings.

FIG. 5A illustrates a process used in one embodiment for dynamically generating and using a set of mappings of queues to outputs. Processing begins with process block 500, and proceeds to process block 502, wherein the queues and outputs are identified. Next, in process block 504, each queue is identified with a particular output. In process block 506, a set of mappings is generated between queues and renamed queues, wherein renamed queues for a particular output are sequential. In process block 508, any additional data structures are generated for representing the mappings. In process block 510, a cut-over operation is performed to dynamically re-map queues to outputs, and to replace the currently active mapping, if any. Processing is complete as indicated by process block 512.

Figure 5B:
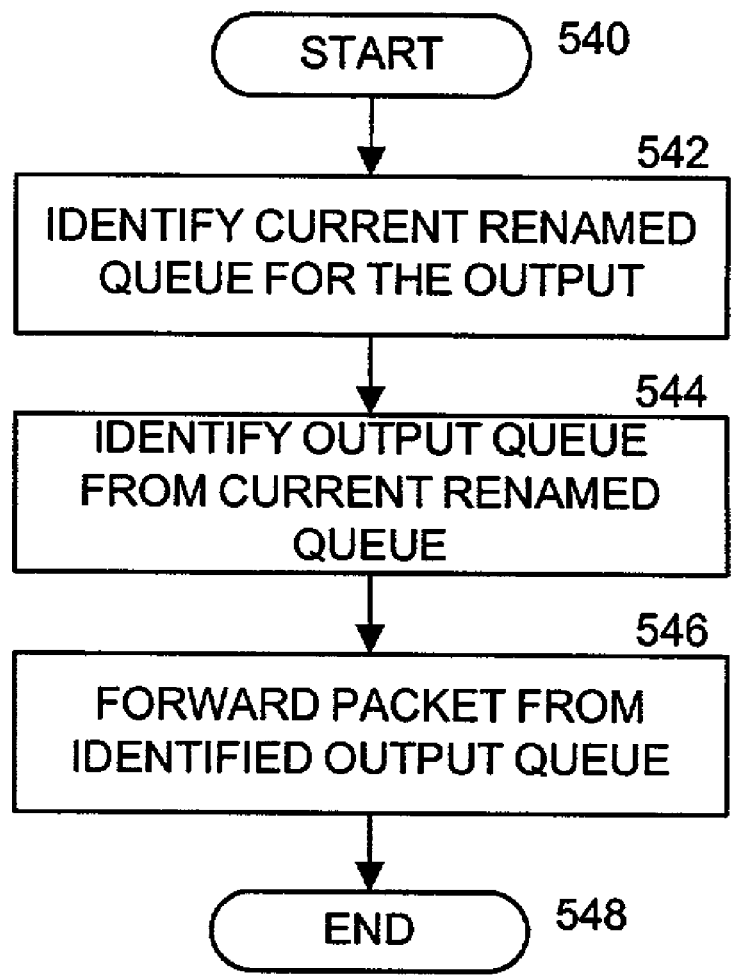

FIG. 5B illustrates a process used in one embodiment to communicate an item from a queue to a particular output. The process illustrated in FIG. 5B can be included in or initiated by a scheduling process or mechanism. Processing begins with process block 540, and proceeds to process block 542, wherein a current renamed queue for the particular output is identified. In one embodiment, a range of renamed queues is identified using the first and last renamed queue indices of the particular output, and the current renamed queue is selected from the renamed queues within this identified range. In one embodiment, a bitmap indicates which of the renamed queues are available, and the current renamed queue is selected from those renamed queues indicated as available within the identified range. Next, in process block 544, the actual output queue is identified based on the current renamed queue (e.g., renamed queue identifier.) In process block 546, the item (e.g., packet) is communicated from the actual queue to the output. Processing is complete as indicated by process block 548.

Figure 6:
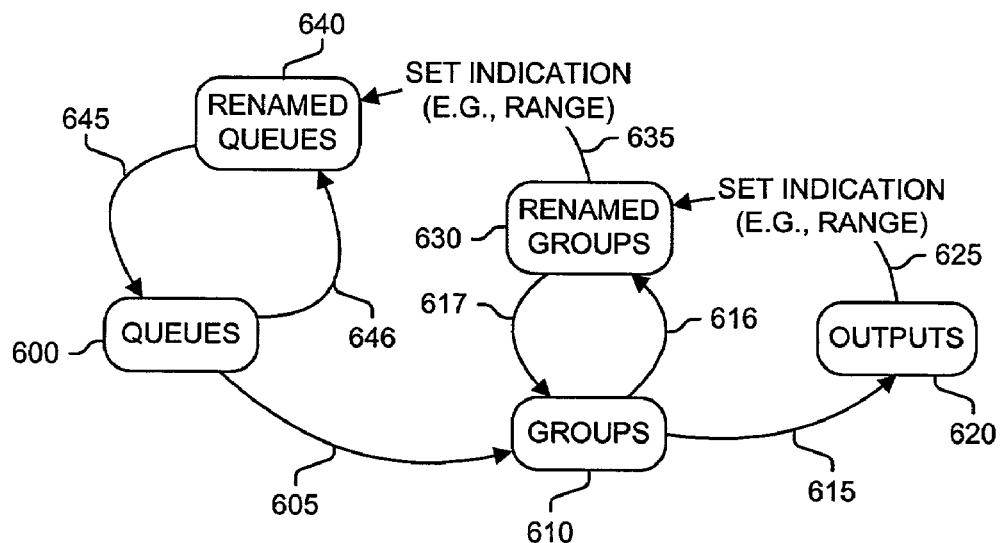
FIG. 6 is a block diagram of a set of mappings used in one embodiment.

FIG. 6 illustrates a set of mappings 605, 615, 616, 617, 625, 635, 645, and 646 used in one embodiment. In one embodiment, a set of groups 610 corresponding to a particular one of outputs 620 are mapped into a sequential set of renamed groups 630, and a set of queues 600 corresponding to a particular one of the groups 610 are mapped into a sequential set of renamed queues 640. In one embodiment, groups 610 and renamed groups 630 correspond to sets of queues 600 (and renamed queues 640) which are traffic shaped together.

When one of the outputs 620 is ready for another item from one of the actual queues 600, a particular one of the renamed groups 630 is identified within the range of corresponding renamed groups for the particular one of outputs 620, and a particular one of the renamed queues 640 is identified within the range of corresponding renamed queues 640 for the particular renamed group. The actual one of the queues 600 is identified based on the particular renamed queue, and the item is communicated for the actual one of the queues 600 to the particular one of the outputs 620.

FIGS. 7A–F are block diagrams of data structures used in one embodiment to represent a set of mappings (such as, but not limited to mappings 605, 615, 616, 617, 625, 635, 645, and 646 from FIG. 6). One embodiment uses all mappings and data structures illustrated in FIGS. 7A–F, while one embodiment uses less than all of these mappings and data structures. Also, one embodiment uses variants of these mappings and data structures, which may require the embodiment to include more or less mappings and/or data structures than represented in FIGS. 7A–F.

Figure 7A:
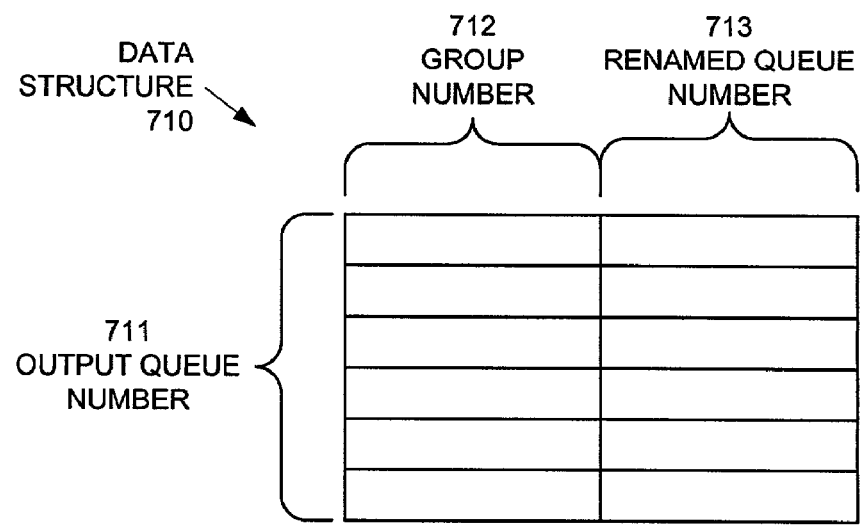
FIGS. 7A–F are block diagrams of data structures used in one embodiment to represent a set of mappings.
Figure 7B:
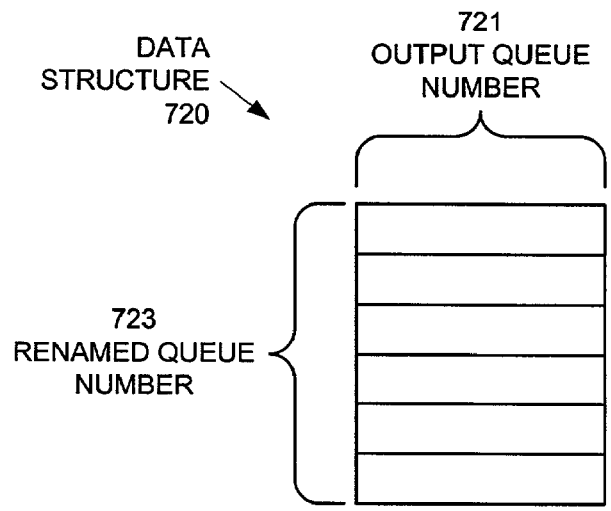
Figure 7C:
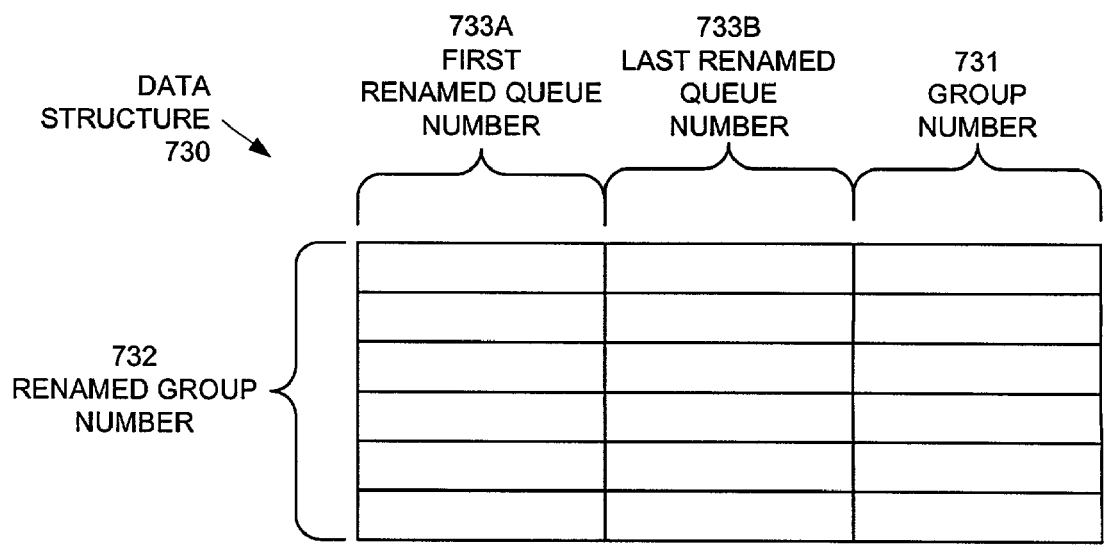
Figure 7D:
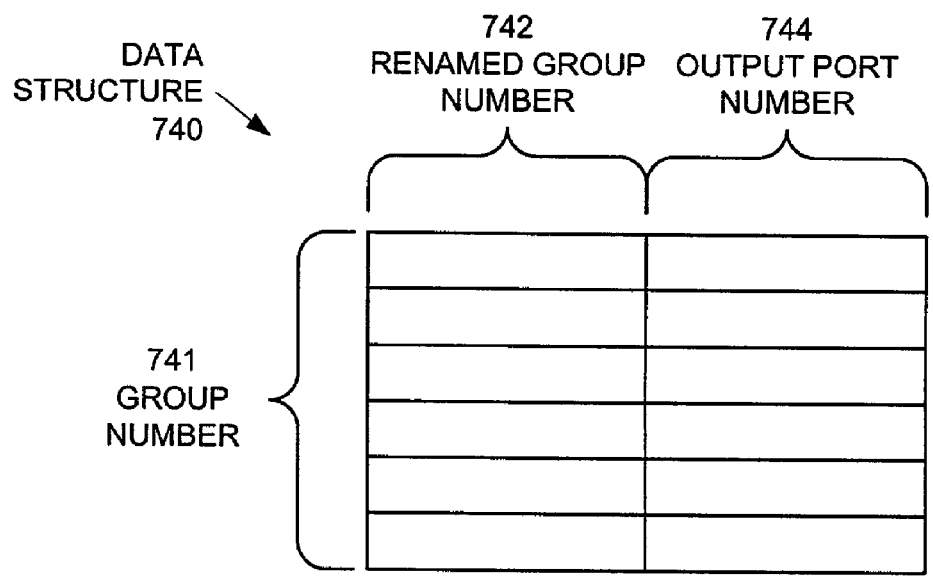
Figure 7E:
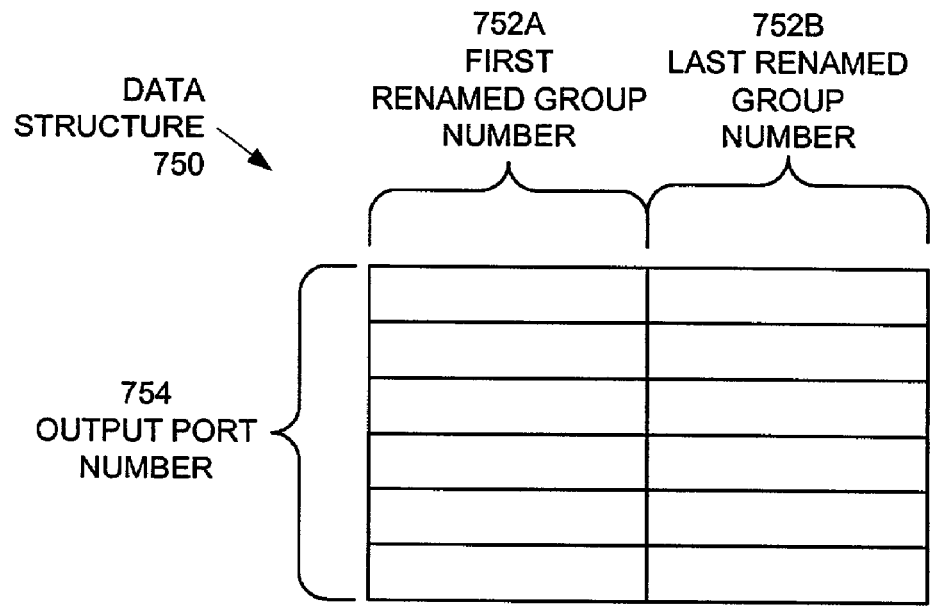
Figure 7F:
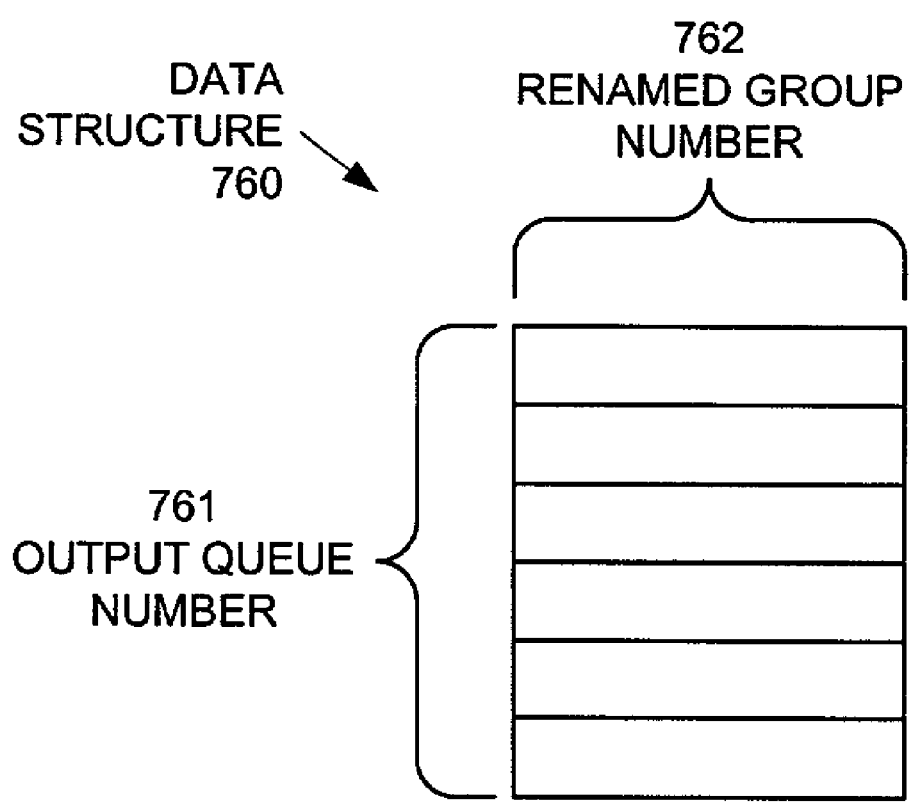

FIG. 7A illustrates one data structure 710 used in one embodiment for identifying a group number 712 and renamed queue number 713 based on an output queue number 711. FIG. 7B illustrates one data structure 720 used in one embodiment for identifying an output queue number 721 based on a renamed queue number 723. FIG. 7C illustrates one data structure 730 used in one embodiment for identifying a range of renamed queue numbers (i.e., first and last renamed queue numbers 733A and 733B) and group number 731 based on renamed group number 732. FIG. 7D illustrates a data structure 740 used in one embodiment for identifying a renamed group number 742 and an output port number 744 based on a group number 741. FIG. 7E illustrates a data structure 750 used in one embodiment for identifying a range of renamed group numbers (i.e., first and last renamed group numbers 752A and 752B) based on output port number 754. FIG. 7F illustrates a data structure 760 used in one embodiment for identifying a renamed group number 762 based directly on an output queue number 761. Note, one embodiment identifies a renamed group number based on an output queue number does not use data structure 760, but rather derives such result using data structures 710 (FIG. 7A) and 740 (FIG. 7D), or via other data structures or mechanisms.

Figure 8A:
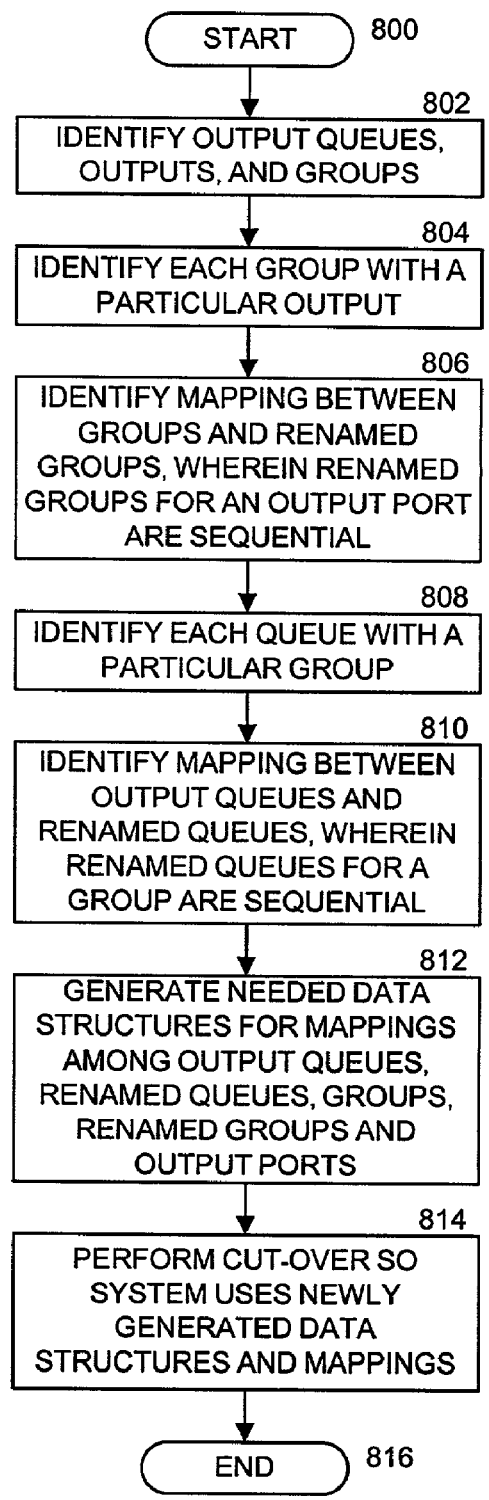
FIGS. 8A–B are flow diagrams used in one embodiment for generating and using a set of dynamic mappings.

FIG. 8A illustrates a process used in one embodiment for generating and dynamically using a set of mappings of queues to outputs. Processing begins with process block 800, and proceeds to process block 802, wherein the queues, outputs, and groups are identified. In process block 804, each group is identified with a particular output. In process block 806, a set of mappings is generated between groups and renamed groups, wherein the renamed groups for a particular output are sequential. In process block 808, each queue is identified with a particular group. Next, in process block 810, a set of mappings is generated between queues and renamed queues, wherein the renamed queues for a particular group are sequential. In process block 812, any additional data structures are generated for representing the mappings. In process block 814, a cut-over operation is performed to dynamically re-map queues to outputs, and to replace the currently active mapping, if any. Processing is complete as indicated by process block 816.

Figure 8B:
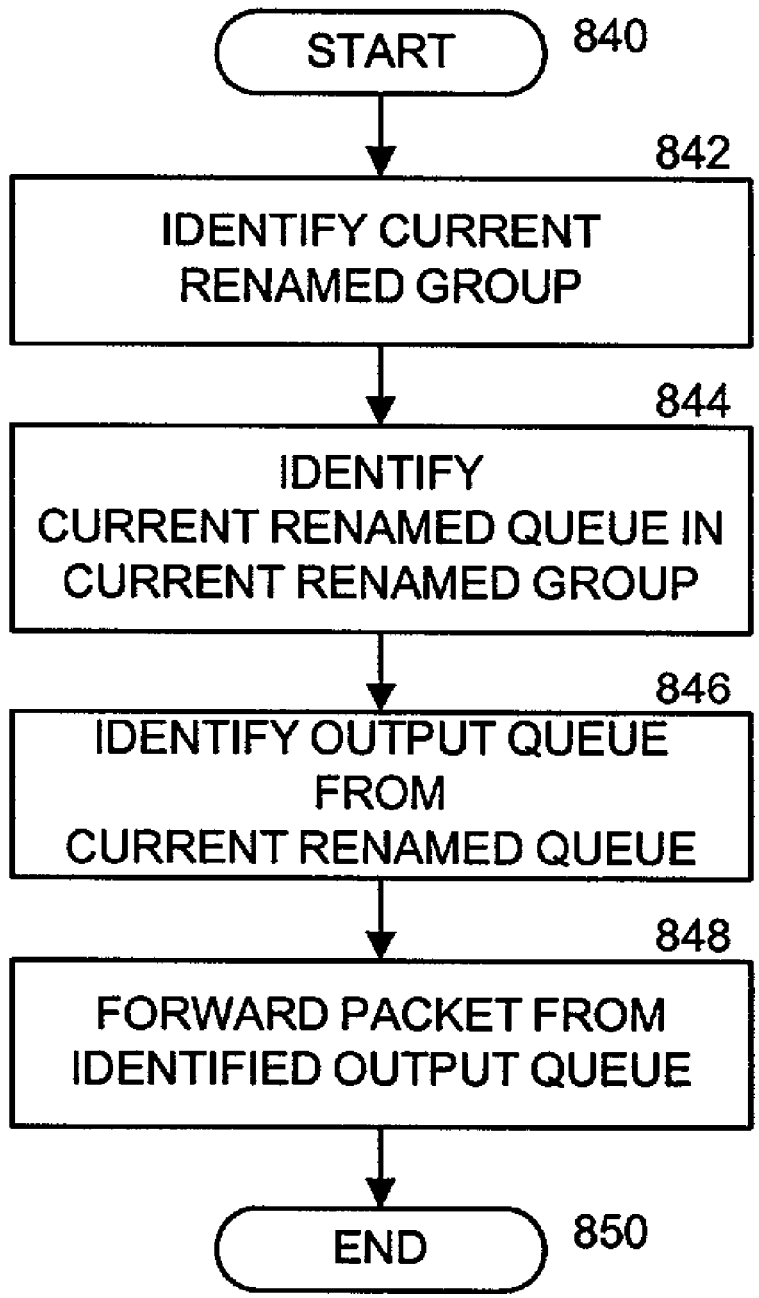

FIG. 8B illustrates a process used in one embodiment to communicate an item from a queue to a particular output. The process illustrated in FIG. 8B can be included in or initiated by a scheduling process or mechanism. Processing begins with process block 840, and proceeds to process block 842, wherein a current renamed group is identified. In one embodiment, a range of renamed groups is identified using the first and last renamed group indices of the particular output, and the current renamed group is selected from the renamed groups within this identified range. In one embodiment, a bitmap indicates which of the renamed groups are available, and the current renamed group is selected from those renamed groups indicated as available within the identified range. Next, in process block 844, a current renamed queue within the current renamed group is identified. In one embodiment, a range of renamed queues is identified using the first and last renamed queue indices for the current renamed group, and the current renamed queue is selected from the renamed queues within this identified range. In one embodiment, a bitmap indicates which of the renamed queues are available, and the current renamed queue is selected from those renamed queues indicated as available within the identified range. In process block 846, the actual queue is identified based on the current renamed queue. In process block 848, the item (e.g., packet) is communicated from the actual queue to the output. Processing is complete as indicated by process block 850.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method comprising:
   mapping each queue of a plurality of queues corresponding to a particular output into renamed queue identifiers sequential within a plurality of renamed queue identifiers;
   identifying a particular renamed queue identifier of the plurality of renamed queue identifiers corresponding to the particular output;
   identifying a particular queue of the plurality of queues based on the particular renamed queue identifier; and
   communicating a particular item from the particular queue to the particular output.

2. The method of claim 1, further comprising maintaining a first set of data structures representing the mapping between the plurality of queues and the plurality of renamed queue identifiers.

3. The method of claim 2, further comprising:
   generating a second set of data structures representing a second mapping between the plurality of queues and the plurality of renamed queue identifiers; and
   switching between the first set of data structures and the second set of data structures.

4. The method of claim 1, wherein each of the plurality of renamed queue identifiers is a number, and a set of renamed queue identifiers corresponding to a selected one of the plurality outputs is identifiable by a numeric range.

5. The method of claim 1, further comprising mapping each queue of the plurality of queues corresponding to a second particular output into renamed queue identifiers sequential within the plurality of renamed queue identifiers.

6. A computer-readable medium containing computer-executable instructions for performing the method of claim 1.

7. A method comprising:
   identifying each group of a plurality of groups with one of the outputs of a plurality of outputs;
   determining a renamed group identifier of a plurality of renamed group identifiers for each of the plurality of groups, wherein renamed group identifiers corresponding to a particular output of the plurality of outputs are sequentially identified within the plurality of renamed group identifiers;
   identifying each queue of a plurality of queues with one of the groups of the plurality of groups;
   determining a renamed queue identifier of a plurality of renamed queue identifiers for each of the plurality of queues, wherein renamed queue identifiers for a particular group are sequentially identified within the plurality of renamed queue identifiers;
   identifying a selected renamed group identifier of the plurality of renamed group identifiers corresponding to a selected output;
   identifying a selected renamed queue identifier of a subset of the plurality of renamed queue identifiers corresponding to the selected renamed group identifier; and
   identifying a selected queue of the plurality of queues based on the selected renamed queue identifier; and
   communicating a selected item based on the selected queue to the particular output.

8. The method of claim 7, wherein a first particular group of the plurality of groups is identified with a first particular output of the plurality of outputs; and a second particular group of the plurality of groups is identified with a second particular output of the plurality of outputs.

9. The method of claim 7, further comprising maintaining a first set of data structures representing the mapping between the plurality of groups and the plurality of renamed group identifiers and the mapping between the plurality of queues and the plurality of renamed queue identifiers.

10. The method of claim 9, further comprising:
    generating a second set of data structures representing a second mapping between the plurality of groups and the plurality of renamed group identifiers and a second mapping between the plurality of queues and the plurality of renamed queue identifiers; and
    switching between the first set of data structures and the second set of data structures.

11. The method of claim 7, wherein each of the plurality of renamed group identifiers is a number, and a set of renamed group identifiers corresponding to a particular one of the plurality outputs is identifiable by a first numeric range.

12. The method of claim 11, wherein each of the plurality of renamed queue identifiers is a number, and a set of renamed queue identifiers corresponding to a particular one of the plurality groups is identifiable by a second numeric range.

13. A computer-readable medium containing computer-executable instructions for performing the method of claim 7.

14. An apparatus comprising:
a plurality of queues;
a plurality of outputs;
one or more memories for maintaining a mapping between the plurality of queues and a plurality of renamed queue identifiers; and
one or more sets of control logic;
wherein said one or more sets of control logic:
identifies a particular renamed queue identifier of the plurality of renamed queue identifiers corresponding to a particular output;
identifies a particular queue of the plurality of queues based on the particular renamed queue identifier; and
initiates communication of a particular item based on the particular queue to the particular output.

15. The apparatus of claim 14, wherein the one or more memories include a first set of data structures representing the mapping between the plurality of queues and the plurality of renamed queue identifiers;
wherein said one or more sets of control logic generates a second set of data structures representing a second mapping between the plurality of queues and the plurality of renamed queue identifiers; and
wherein said one or more sets of control logic switches between the first set of data structures and the second set of data structures.

16. The apparatus of claim 14, wherein each of the plurality of renamed queue identifiers is a number, and a set of renamed queue identifiers corresponding to a particular one of the plurality outputs is identifiable by a numeric range.

17. An apparatus comprising:
a plurality of queues;
a plurality of outputs;
one or more memories for maintaining a mapping between a plurality of groups and a plurality of renamed group identifiers and a mapping between the plurality of queues and a plurality of renamed queue identifiers; and
one or more sets of control logic;
wherein said one or more sets of control logic:
identifies a particular renamed group identifier of the plurality of renamed group identifiers corresponding to a particular output;
identifies a particular renamed queue identifier of a subset of the plurality of renamed queue identifiers corresponding to the particular renamed group identifier; and
identifies a particular queue of the plurality of queues based on the particular renamed queue identifier; and
initiates communication of a particular item based on the particular queue to the particular output.

18. The apparatus of claim 17, wherein the one or more memories include a first set of data structures representing the mapping between the plurality of groups and the plurality of renamed group identifiers and the mapping between the plurality of queues and the plurality of renamed queue identifiers;
wherein said one or more sets of control logic generates a second set of data structures representing a second mapping between the plurality of groups and the plurality of renamed group identifiers and a second mapping between the plurality of queues and the plurality of renamed queue identifiers; and
wherein said one or more sets of control logic switches between the first set of data structures and the second set of data structures.

19. The apparatus of claim 17, wherein each of the plurality of renamed group identifiers is a number, and a set of renamed group identifiers corresponding to a particular one of the plurality outputs is identifiable by a numeric range.

20. The apparatus of claim 17, wherein each of the plurality of renamed queue identifiers is a number, and a set of renamed queue identifiers corresponding to a particular one of the plurality groups is identifiable by a numeric range.

21. An apparatus comprising:
means for mapping each queue of a plurality of queues corresponding to a particular output into renamed queue identifiers sequential within a plurality of renamed queue identifiers;
means for identifying a particular renamed queue identifier of the plurality of renamed queue identifiers corresponding to the particular output;
means for identifying a particular queue of the plurality of queues based on the particular renamed queue identifier; and
means for communicating a particular item from the particular queue to the particular output.

22. The apparatus of claim 21, further comprising means for maintaining a first set of data structures representing the mapping between the plurality of queues and the plurality of renamed queue identifiers.

23. The apparatus of claim 22, further comprising:
means for generating a second set of data structures representing a second mapping between the plurality of queues and the plurality of renamed queue identifiers; and
means for switching between the first set of data structures and the second set of data structures.

24. The apparatus of claim 21, wherein each of the plurality of renamed queue identifiers is a number, and a set of renamed queue identifiers corresponding to a particular one of the plurality outputs is identifiable by a numeric range.

25. An apparatus comprising:
means for identifying each group of a plurality of groups with one of the outputs of a plurality of outputs;
means for determining a renamed group identifier of a plurality of renamed group identifiers for each of the plurality of groups, wherein renamed group identifiers corresponding to a particular output of the plurality of outputs are sequentially identified within the plurality of renamed group identifiers;
means for identifying each queue of a plurality of queues with one of the groups of the plurality of groups;
means for determining a renamed queue identifier of a plurality of renamed queue identifiers for each of the plurality of queues, wherein renamed queue identifiers for a particular group are sequentially identified within the plurality of renamed queue identifiers;

means for identifying a selected renamed group identifier of the plurality of renamed group identifiers corresponding to a selected output;

means for identifying a selected renamed queue identifier of a subset of the plurality of renamed queue identifiers corresponding to the selected renamed group identifier; and means for identifying a selected queue of the plurality of queues based on the selected renamed queue identifier; and means for communicating a selected item based on the selected queue to the particular output.

26. The apparatus of claim 25, further comprising means for maintaining a first set of data structures representing the mapping between the plurality of groups and the plurality of renamed group identifiers and the mapping between the plurality of queues and the plurality of renamed queue identifiers.

27. The apparatus of claim 26, further comprising:

means for generating a second set of data structures representing a second mapping between the plurality of groups and the plurality of renamed group identifiers and a second mapping between the plurality of queues and the plurality of renamed queue identifiers; and means for switching between the first set of data structures and the second set of data structures.

28. The apparatus of claim 27, wherein each of the plurality of renamed group identifiers is a number, and a set of renamed group identifiers corresponding to a particular one of the plurality outputs is identifiable by a first numeric range.

29. The apparatus of claim 28, wherein each of the plurality of renamed queue identifiers is a number, and a set of renamed queue identifiers corresponding to a particular one of the plurality groups is identifiable by a second numeric range.

\* \* \* \* \*